United States Patent [19]

Hendel

[11] 4,151,423
[45] Apr. 24, 1979

[54] FLOWING SALINE WATER MAGNETOHYDRODYNAMIC ELECTRIC GENERATOR

[76] Inventor: Frank J. Hendel, 721 Johnson St., San Luis Obispo, Calif. 93401

[21] Appl. No.: 919,470

[22] Filed: Jun. 27, 1978

Related U.S. Application Data

[63] Continuation-in-part of Ser. No. 783,549, Apr. 1, 1977, Pat. No. 4,110,630.

[51] Int. Cl.² ............................................. F03B 13/12
[52] U.S. Cl. ........................................ 290/42; 310/11; 290/53; 290/43; 290/54
[58] Field of Search .................... 310/11; 290/1, 2, 42, 290/43, 53, 54; 417/100

[56] References Cited

U.S. PATENT DOCUMENTS

| 3,161,788 | 12/1964 | Russell | 310/11 |
|---|---|---|---|
| 3,387,150 | 6/1968 | Powers et al. | 310/11 |
| 3,940,640 | 2/1976 | Petty et al. | 310/11 |

FOREIGN PATENT DOCUMENTS

| 1360382 | 3/1964 | France | 310/11 |
|---|---|---|---|
| 413066 | 8/1964 | Switzerland | 310/11 |

OTHER PUBLICATIONS

"Geomagnetism," by Chapman & Bartels, Oxford Univ. Press, 1940, pp. 445-448, 708, 710.
"Magnetohydrodynamic Power Generation," Discovery; The Magazine of Scientific Progress, Aug. 1961, vol. XXII/68.

*Primary Examiner*—Robert K. Schaefer
*Assistant Examiner*—John W. Redman
*Attorney, Agent, or Firm*—Spensley, Horn & Lubitz

[57] ABSTRACT

A magnetohydrodynamic electric generator for the direct energy conversion of the kinetic energy of saline water flowing through a magnetic field, preferably in the constricted part of a duct. Means may be provided to increase the kinetic energy of the flowing saline water using wave-powered air compressors and/or water pumps. Also described are sea platforms containing a multitude of electricity generators in a configuration to maximize the conversion of the kinetic energy of flowing saline water into electric energy.

23 Claims, 8 Drawing Figures

FLOWING SALINE WATER MAGNETOHYDRODYNAMIC ELECTRIC GENERATOR

CROSS-REFERENCE TO RELATED APPLICATION

This application is a continuation in part of U.S. Application Ser. No. 783,549, filed Apr. 1, 1977 now U.S. Pat. No. 4,110,630, by the present inventor and titled "Wave Powered Electric Generator."

BACKGROUND OF THE DISCLOSURE

1. Field of the Invention

This invention relates to a magnetohydrodynamic electric generator, particularly one designed for the direct energy conversion of the kinetic energy of flowing saline water.

2. Description of Prior Art

With the ever-increasing need of industrialized nations for power, and with the increasing problems posed by conventional sources of power, the development of new power sources is of critical importance. One such power source is that offered by flowing saline water—ocean currents, tides, waves, etc. It has been estimated that the total wave power alone available in the world's oceans may be as high as $90 \times 10^{15}$ watts—indeed an immense amount of power—and that the renewal rate of this power source alone is on the order of $10^{12}$ to $10^{13}$ watts. Saline water power is clean, safe and permanent. Certainly then, the kinetic energy of saline water potentially could be quite important as a power source. Yet, while there is an increasing interest in this potential source of power, few practical systems presently exist to extract any significant amount of power from the world's restless oceans.

The present invention is designed to directly extract the kinetic energy of flowing ocean water by means of a magnetohydrodynamic (hereinafter "MHD") electric generator. While the existance of the MHD effect has been known for many years, previously it has not been used in an electric generator design that directly employs the flow of ocean water as the conducting fluid necessary to the effect.

Further, while various ocean powered generators have been proposed, typically they are rigidly attached to the sea bottom and extract power from the passing waves. Such rigid attachments can be quite difficult to achieve and maintain. A generator that did not require such a support would therefore be quite desireable.

An objective, then, of this present invention is to provide a practical magnetohydrodynamic eletric generator, one which can be tethered to an ocean bottom and generate electric power from the motion of ocean water substantially unattended. The generator should be simple, sea-worthy, and rugged in construction, yet offer significant amounts of electric power. These and other objectives of the invention will appear from the following description of preferred embodiments.

BRIEF SUMMARY OF THE INVENTION

The present invention consists of a duct to receive and direct flowing saline water through a strong magnetic field perpendicular to the flow of water embraced by powerful magnets or electromagnets placed on opposite sides of the duct. Because of the phenomenon of MHD, an electric field is induced orthogonal to both the direction of saline water flow and the direction of the magnetic field. Thus, an electric current can be withdrawn from two opposed electrodes spanning the magnetic field and in direct contact with the saline water.

The electrode structure employed in the present invention preferably consists of two facing planes each having alternating strips of conductor and insulator, each conductor in one plane being electrically connected to a diagonally opposing conductor in the facing plane, all in a uniform fashion. This electrode design gives a higher power density and greatly simplifies the external electric load circuit in comparison to other known designs. Of course, other types of electrodes maybe used such as the segmented type, or Hall type, or continous type, or others.

Because the strength of the MHD-induced electric field is directly proportional to the velocity of the flowing saline water, the induced electric field can be increased by increasing the kinetic energy of the saline water flowing through the duct of the MHD electric generator. The preferred method for accomplishing this increase in velocity employs a duct having a constricted throat section. As the saline water flows into the flared opening of the duct, its velocity, and hence its kinetic energy, is increased. Because both ends of the MHD electric generator duct can be equipped with such a flared opening, the kinetic energy of the flowing saline water can be augmented whether the sea is flowing or ebbing. The alternating current resulting from changes in the direction of water flow preferably are electrically rectified and condensed to direct current for transmission to a power station.

To further increase the velocity of the saline water flowing through the duct, within his water flow compressed water or air can be blown through the duct, too, this compressed fluid preferably being generated by a wave-powered pump. Various support and anchoring structures also are disclosed, in one embodiment, they consist of a vast rigid planar structure floating just beneath the ocean's surface. The planar structure is anchored to the bottom of the ocean. Attached to the structure are parallel rows of MHD ducts each row being flexibly hinged to, but rigidly spaced from, adjacent rows. The advantage of this rigid planar structure is that while some rows of the MHD ducts coincide with wave crests, other rows coincide with wave troughs. Thus, while the wave crests will tend to move the MHD ducts in the direction of wave travel, the troughs tend to move the ducts in the opposite direction. These opposing forces cancel one another, stabilizing the large planar structure and achieving a higher saline water velocity through the MHD ducts than would be true for a mobile structure.

BRIEF DESCRIPTION OF THE DRAWINGS

The invention will be further described in connection with the accompanying drawings in which.

DETAILED DESCRIPTION

1. The Basic Magnetohydrodynamic Electric Generator

Figure 1:
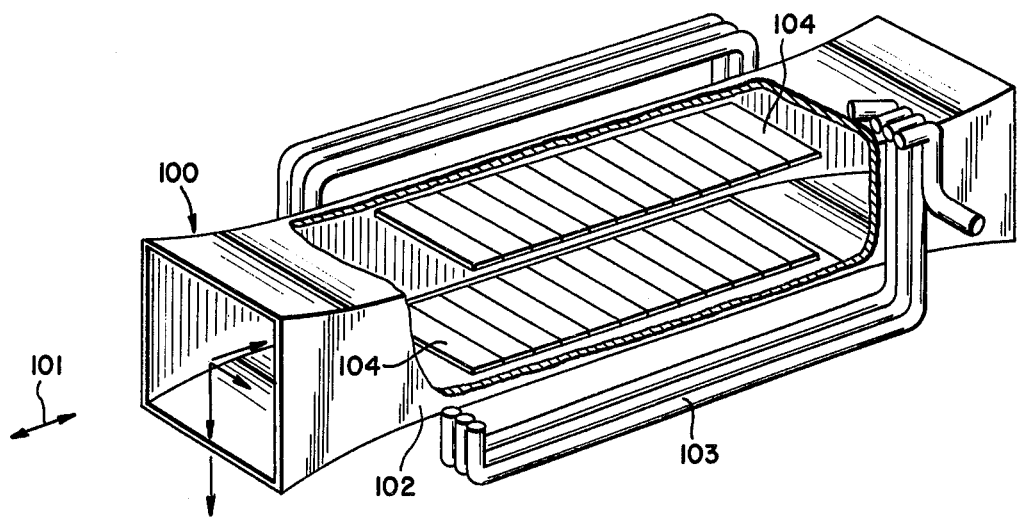
FIG. 1 is a perspective view, partially broken away, of a preferred flowing saline water magnetohydrodynamic electric generator.

FIG. 1 discloses the heart of the present invention, a magnetohydrodynamic (hereinafter "MHD") electric generator. It consists of a duct 100 that receives flowing saline water 101. The duct has flared end openings and an elongated narrow passage 102, along this passage are provided opposed magnetic field elements, such as electromagnetic coils 103 although permanent magnets could be employed if desired. Because of the phenomenon of MHD, an electric field is induced orthogonal to both the direction of conductive saline water flow 101 and the direction of the magnetic field. Thus, an electric current can be drawn from two facing sets of electrodes 104 in direct contact with the flowing saline water 101.

Figure 2:
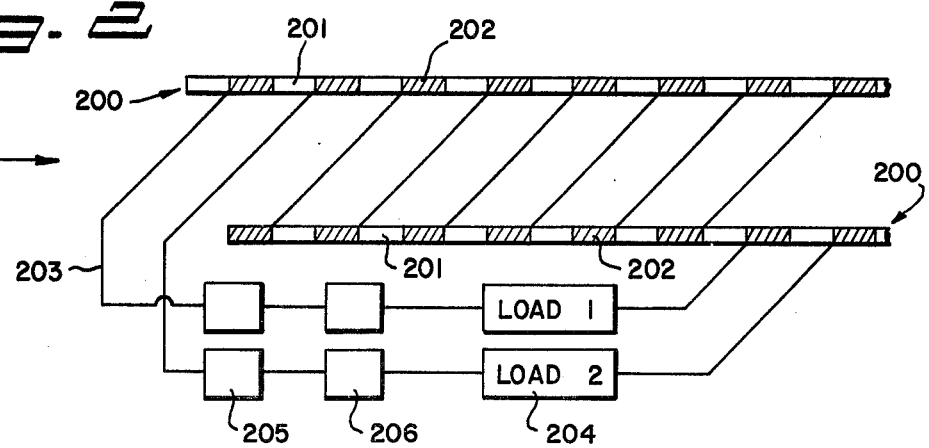
FIG. 2 is a sectional view of a preferred diagonally-connected electrode structure of the generator.

The structure of the preferred electrode is shown in greater detail in FIG. 2. Two parallel planes 200, each consisting of alternating strips of a conductor 201 and an insulator 202, are electrically connected such that each conductor 201 is linked to a diagonally opposite conductor 201, generally as shown. The electrical circuit is completed between the opposed conductors 201 through the conductive sea water. Such an electrode structure achieves a high power density. Of course, various other types of electrodes could be employed, such as ssegmented types, Hall types, etc. The end electrodes may be connected by conductors 203 to simplified dual external electric load circuits 204, as shown, the conductors transmitting the generated power to these loads, which of course may be remotely located.

Because the direction of the MHD-induced electric current in the electric load circuits 204 depends upon the direction of saline water flow, electrical control circuits 205 and condensers 206 are placed in series with the electric load circuits 204 to convert the randomly alternating current produced by the MHD electric generator into a relatively constant direct current. Preferably the electrical control circuits include elements to prevent substantial leakage of the generated electrical power through the electrodes to the sea water. To this end, such control circuitry may include elements which sense the level of generated power and compare it to the potential of the stored power, the circuit opening the connection where the generated power level drops below the stored power level.

Figure 3:
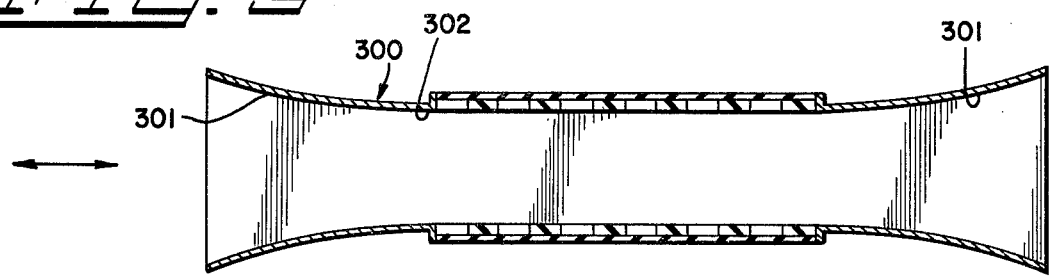
FIG. 3 is a side view of the duct.

The MHD electric generator channelizing duct is shown in FIG. 3. The duct 300 preferably includes flared openings 301 on both ends, and a constricted section or elongated, narrow passage 302. Thus, the kinetic energy of saline water flowing into the duct 300 is increased as it flows through the constriction 302 regardless of the direction of saline water flow. Since the strength of an MHD-induced electric current field is directly proportional to the velocity of the saline water flowing through the duct 300, this constriction significantly enhances the energy conversion capability of the present invention. While the throat of the duct is shown as having straight sides, to better accomodate the water flow typical of at least small waves, it may be arcuate or curved, the arc approximating the natural flow path of the wave thereby presenting a minimum impedance to such flow.

2. Wave-powered Kinetic Energy Augmentation Devices

Figure 4:
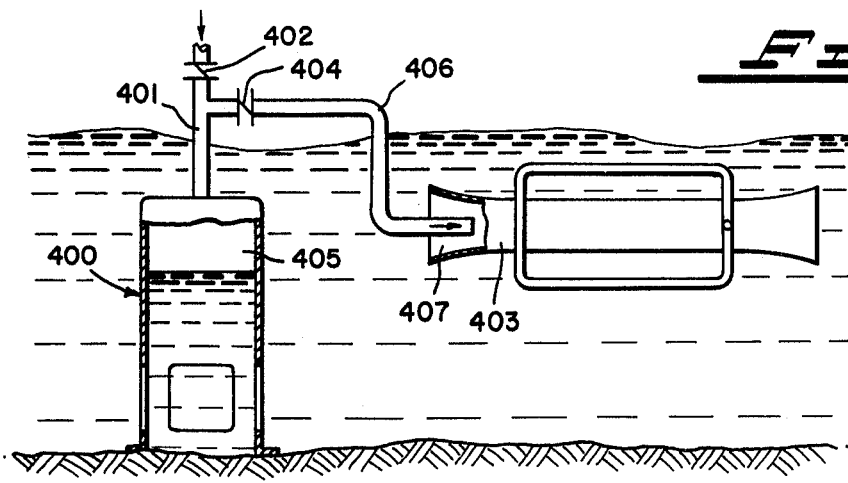
FIG. 4 is a view in vertical cross-section of a wave-powered air compressor for the augmentation of the kinetic energy of flowing saline water.
Figure 5:
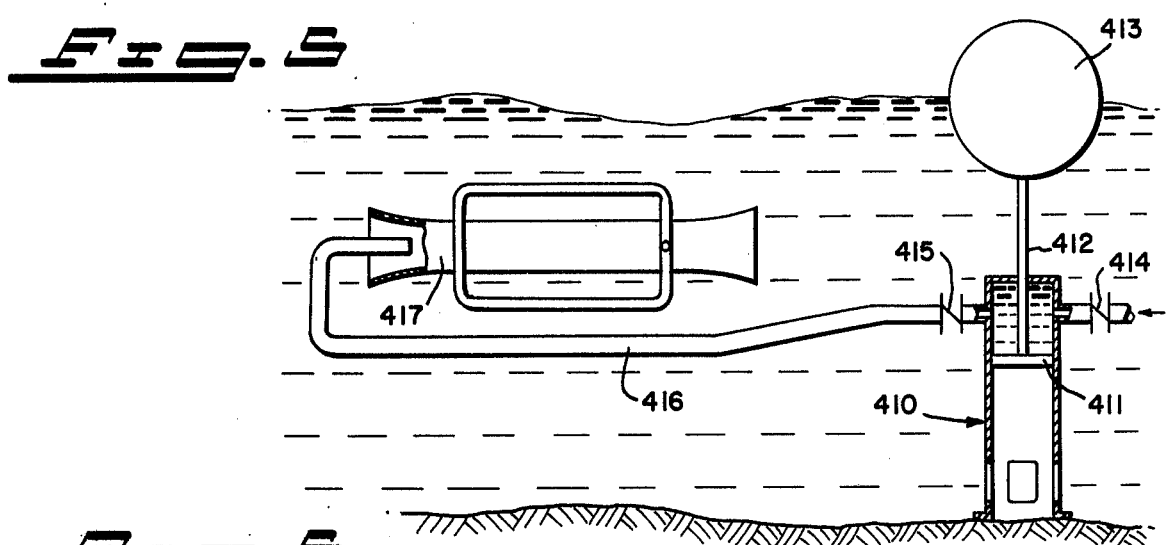
FIG. 5 is a vertical cross-sectional view of a wave-powered water pump for the augmentation of the kinetic energy of flowing saline water.

As noted previously, the strength of an MHD-induced electric current is directly proportional to the velocity of the saline water flowing through the MHD electric generator duct. FIGS. 4 and 5 disclose two wave-powered devices designed to augment the kinetic energy of saline water flowing through an MHD duct. Either or both of these devices may be used in conjunction with individual MHD electric generators, or with the MHD duct ocean support structures described in the next section.

Referring now to FIG. 4, there is shown a vertical, open-bottomed, hollow buoy or chamber 400 which is anchored directly or indirectly, to the ocean floor. Connected to the top of the chamber is a conduit structure 401, one branch of which communicates with the atmosphere through an inlet check-valve 402, another branch of which communicates with an MHD 403 duct through an outlet duct valve 404. As the wave crest passes the tube 400, the water within it subsides, producing a pressure differential, thus causing inlet check-valve 402 to open and outlet check-valve 404 to close, thereby replenishing the air supply 405 within the chamber 400. As the next wave crest passes over chamber 400, the water within chamber 400 rises, and compresses air 405 previously trapped inside it. This compression forces the air out of chamber 400 through the outlet check-valve 404 and through the interconnecting conduit 406 into the submerged opening 407 of the MHD electric generator duct 402. The chamber 400 is spaced in relation to the duct such that the compressed air injection occurs as the wave crest is passing the duct. Thus the effect of this compressed air injection into the duct is to force saline water through the MHD duct at a higher velocity than otherwise. The compression cycle automatically repeats as each wave encounters the tube 400.

Referring now to FIG. 5, there is shown a second wave-powered device for increasing the velocity of saline water through an MHD duct. A vertical open-bottomed piston cylinder chamber 410 is rigidly attached, directly or indirectly, to the MHD duct. It encloses a piston 411 attached by a rod 412 to a floating buoy 413. Above the piston and in the wall of the cylinder 410 are provided an inlet check-valve 414 and an outlet check valve 415 which communicates through conduit 416 with MHD duct 417. As a wave crest passes beyond the buoy 413, the piston 411 subsides within the cylinder 410, producing a pressure differential, above it sufficient to cause the inlet check-valve 414 to open and the outlet check-valve 415 to close, thereby replenishing the water supply 414 within the tube 400. As the next wave crest encounters the buoy 413, the buoy is pulled upwards, causing the piston 411 to force the water captured above it in the cylinder through the outlet check-valve 415. The pressurized water coming out of the exit check-valve 415 is led by a conduit 416 into the opening of MHD electric generator duct 417. The buoy is spaced, relative to the duct, such that the compressed water injection into the duct occurs as a wave crest is passing the duct. Thus, the effect of this compressed water injection into the duct is to force a stream of saline water through the MHD duct at a higher velocity than otherwise. The pressurization cycle is repeated as each wave encounters the buoy 413.

One advantage of these saline water kinetic energy augmentation devices is that both are powered by the energy of ocean waves, and thus neither consumes energy from more expensive or precious sources. Moreover, they augment significantly the generated electric energy.

3. MHD Electric Generator Ocean Support Structures

An MHD electric generator such as is shown in FIG. 1 may be attached to a buoy anchored to the ocean floor such that the channeling duct 100 is buoyed and anchored just beneath the surface of the water at all times and oriented into the flow of water by "weathercock" vanes or other mechanical means. Alternatively, several MHD electric generators may be clustered together in various configurations.

Figure 6:
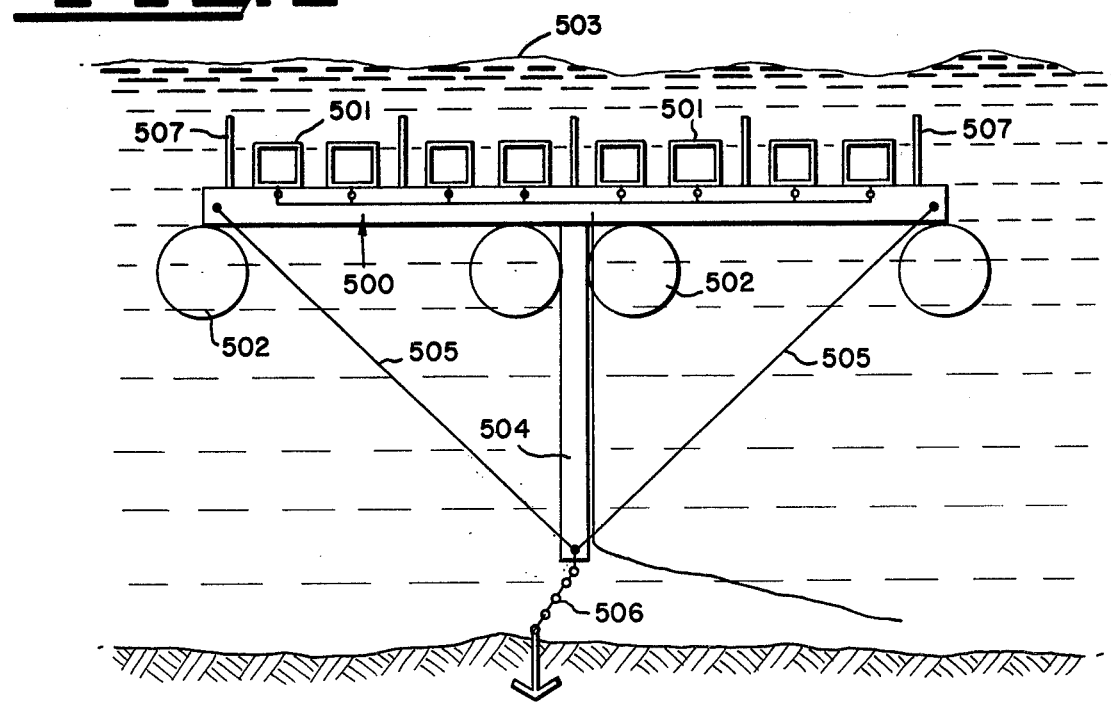
FIG. 6 is a vertical cross-sectional view of an ocean support structure for a multitude of MHD ducts.

FIG. 6 illustrates a single-beam ocean support structure that provides for effective positioning of a multitude of MHD electric generators. A rigid horizontal beam structure 500, with a wide top flange to support a multitude of saline water MHD electric generators 501 constructed as previously described, includes a multitude of buoys 502 the combined buoyancy of which is just sufficient to keep the MHD ducts 501 positioned slightly below the ocean's surface 503, a position at which the water flow is strongest. Rigidity and the preferred orientation of the beam 500 may be enhanced by means of a vertical column 504 and diagonal rods or cables 505. The rigid beam structure may be anchored to the ocean floor by an adjustable length chain or other flexible tie 506 permitting the beam 500 to rise or fall with the tide, thus maintaining the MHD ducts 501 at the optimum level beneath the ocean surface 503. The flexibility of the anchoring tie 506 also permits the rigid beam to be automatically positioned perpendicular to the direction of water flow by means of attached "weathercock" vanes or trailing rudders 507, or by other appropriate mechanical means. Alternatively, the beam structure may be rigidly attached to the ocean floor by means of the supporting vertical column 504 such that the MHD ducts 501 will be below the ocean's surface at the lowest ebb tide. This latter configuration somewhat simplifies the single-beam ocean support structure but energy conversion is reduced due to the diminished kinetic energy imparted to the water flow through the ducts when the ocean's surface is significantly above water the low-tide water level, which of course usually will be the case.

Figure 7:
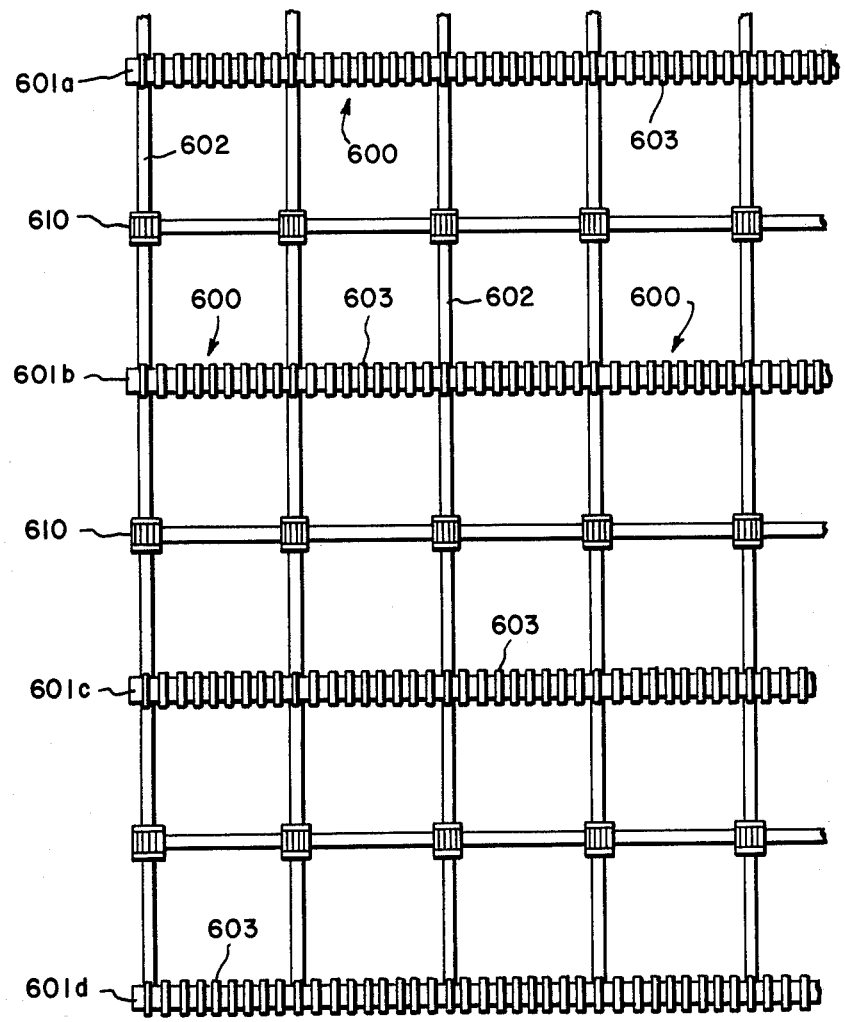
FIG. 7 is a top-view of a vast planar array ocean support structure for a great multitude of MHD ducts.
Figure 8:
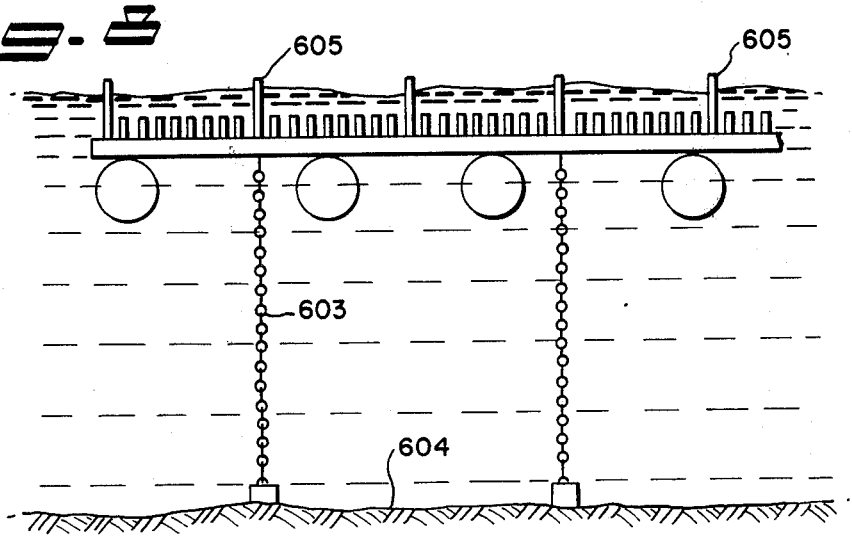
FIG. 8 is a view in vertical cross-section of the vast planar array ocean support structure.

FIGS. 7 and 8 disclose a second ocean support structure that provides for effective and efficient support and positioning of a large number of MHD electric generators. Shown in a top view in FIG. 7, the structure is basically a vast planar array of MHD electric generator structures 600 arranged in long parallel rows. Each row 601 may consist, for example, of several of the structures 500 shown in FIG. 6 set end-to-end and rigidly connected as shown in FIG. 8. Each row 601 is connected to the next parallel row by an open lattice work 602, thus allowing water flow to reach every row. Preferably the interconnecting structure 602 spaces adjacent rows one-half the normal distance between wave crests of that location.

The planar structure is anchored preferably by flexible ties 603 to the ocean floor 604. The length of the ties 603 may be adjustable, automatically or by manual control, to assist in maintaining the planar structure at the appropriate flotation level. "Weathercock" vanes or trailing rudders 605 or other mechanical means may be used to orient the planar structure into the stream of saline water flow, as is shown in FIG. 8.

The advantage of this rigid planar structure and row spacing is that, while some rows 601 of the MHD ducts are encountering wave crests, other rows encounter wave troughs. For example, referring now to FIG. 7, rows 601a and 601c may be encountering wave crests while rows 601b and 601d are within wave troughs. Thus, while the force exerted by the wave crests is in a direction to move the multitude of MHD electric generator ducts 603 in rows 601a and 601c in the direction of wave travel, the wave troughs try to move the MHD ducts 603 in rows 601b and 601d in the opposite direction. The opposing forces exerted by the wave crests and wave troughs therefore cancel each other, stabilizing the entire rigid planar structure and thus permitting a higher saline water velocity through the MHD electric generator ducts.

A variation of the above planar interconnecting structure provides hinging between parallel rows of MHD ducts. Referring still to FIG. 7, the planar structure is hinged along the parallel joints 610. Such hinging allows the structure to conform to the shape of the crests and troughs of waves passing in a direction perpendicular to the parallel rows 601 of the structure. An advantage of a hinged structure over a rigid structure is that a hinged structural form may be buoyed just below the water level where the water motion is greatest regardless of local water level changes caused by waves, whereas a rigid structure should be buoyed below the average or lowest local water level so that all of the MHD ducts on the structure are always submerged.

While specific embodiments of the preferred magneto-hydrodynamic electric generator and auxiliary devices have been described, since variations will occur to those skilled in this art the scope of the invention is not limited to these particular embodiments. Rather, it is set forth in the following claims.

What is claimed is:

1. A flowing saline sea water MHD electric generator comprising:
   a duct for the channelization of conductive flowing saline water;
   means applying a magnetic field orthogonal to the longitudinal axis of the duct;
   electrode means positioned orthogonally to both the magnetic field and the flow of water through the duct, and in contact with the flowing conductive saline water therein such that the electrode means receives at least some of the electrical energy generated as the sea ebbs and flows and the conductive flowing saline water passes through the magnetic field;
   means to augment the flow of sea water thru the duct in synchronization with wave flow past the duct, thereby to increase the generated electrical energy;
   buoying and anchoring means for holding the duct just beneath the surface of the water;
   means connected to the electrode means for both rectifying and condensing the electrical energy generated by motion of the flowing saline water through the magnetic field;
   means to prevent leakage of electric current from the condensing means to the saline water; and power transmission means for supplying the generated, rectified, and condensed electric energy to an external electrical load.

2. The invention according to claim 1 wherein said means for applying a magnetic field includes an electromagnet.

3. The invention according to claim 1 wherein said electrode means includes diagonally-connected conductor strips.

4. The invention according to claim 3 including dual external electric load circuits, the diagonally connected conductor strips being connected to the dual loads.

5. The invention according to claim 1 wherein said rectifying means includes an element connected to each electrode means permitting power to flow only from the electrode means though the power transmission means to an external load circuit.

6. The invention according to claim 1 wherein said condensing means includes an element connected to each electrode means permitting electrical energy to be stored and thereafter discharged at a relatively constant rate through the power transmission means to an external load circuit.

7. The invention according to claim 1 wherein said duct has at least one flared opening for substantially increasing the velocity of water flowing through the duct.

8. The invention according to claim 1 wherein said duct has a flared opening at both ends substantially increasing the velocity of water flowing through the duct.

9. The invention according to claim 1 including means to orient the duct into the flow of saline water.

10. The invention according to claim 1 including means to augment the flow of saline water through the duct.

11. The invention according to claim 10 in which the augmentation means includes:
a vertical, open-bottomed, hollow chamber;
means for anchoring the chamber to the ocean floor in a location, relative to the duct, such that the wave flow over the chamber is synchronized with the wave flow past the duct;
conduit means and an inlet valve attached to and conducting flexibility to the chamber, thereby allowing for the replenishment of the fluid supply within the chamber after a wave has passed the chamber, while restricting the flow of wave-compressed fluid from the chamber;
conduit means attached to and conducting fluid within the chamber compressed by the action of a passing wave into the opening of the MHD electric generator duct; and
an outlet valve for allowing compressed fluid to flow only towards the MHD duct and restricting the backflow of such compressed fluid to the chamber.

12. The invention according to claim 10 in which the augmentation means includes:
a vertical open-bottomed piston cylinder;
means for anchoring the cylinder to the ocean floor in a location, relative to the duct, such that the wave flow over the chamber is synchronized with the wave flow past the duct;
a piston received within the cylinder;
a buoy attached to the piston;
conduit means for conducting saline water within the cylinder, pressurized by the action on the buoy of an encountering wave, into the opening of an MHD electric generator duct;
an outlet valve means for allowing pressurized saline water to flow only towards the MHD duct and restricting the backflow of water; and
an inlet valve means leading to the surrounding water allowing for the replenishment of the water supply within the cylinder after a wave has passed and the buoy and connected piston have subsided, while restricting the flow of wave-pressurized saline water into the surrounding water.

13. The invention according to claim 1 in which the buoying and anchoring means includes:
a plurality of rigid horizontal beam for supporting a multitude of MHD electric generators;
buoying means;
means attaching the MHD generators to the buoying means, the buoying means keeping the MHD ducts just below the surface of the ocean;
the anchoring means attaching the buoyed beam to the ocean floor; and
means attached to the beam to orient the ducts into the flow of saline water.

14. The invention according to claim 13 wherein said anchoring means are flexible, allowing the horizontal beams to rise or fall with the tides.

15. The invention according to claim 13 wherein said anchoring means are rigid and the horizontal beams are anchored at a level below the ocean surface at the lowest ebb tide.

16. The invention according to claim 13 including water-powered fluid compressor means, and means conducting compressed fluid to the MHD ducts to augment the kinetic energy of saline water flowing through the MHD electric generator ducts.

17. The invention according to claim 1 in which the buoying and anchoring means includes a planar array ocean support structure for a great multitude of MHD electric generators comprising:
long parallel rows of MHD electric generators;
open-lattice connecting means attaching the MHD generators in parallel rows;
buoying means connected to the MHD generators to keep the MHD ducts just below the surface of the ocean; and
the anchoring means attaching the connecting means to the ocean floor.

18. The invention according to claim 17 including means orienting the MHD ducts of the planar array into the flow of saline water.

19. The invention according to claim 17 wherein said anchoring means are flexible, allowing the planar array to rise or fall with the tides.

20. The invention according to claim 17 wherein said anchoring means are rigid and the planar array is anchored at a level below the ocean's surface at the lowest ebb tide.

21. The invention according to claim 17 including water-powered fluid compressor means, and means conducting compressed fluid to the MHD ducts to augment the kinetic energy of saline water flowing through the MHD electric generator ducts.

22. The invention according to claim 17 wherein said connecting means are rigid.

23. The invention according to claim 17 wherein said connecting means are rigid along axes perpendicular to the rows of MHD ducts but flexible along axes parallel to the rows of MHD ducts, such that the rows of MHD ducts may conform to the shape of the crests and troughs of waves passing in a direction perpendicular to said rows.

* * * * *